United States Patent [19]
Stöck et al.

[11] Patent Number: 5,820,312
[45] Date of Patent: Oct. 13, 1998

[54] DEVICE FOR TRANSMITTING IMPULSE-LIKE BLOWS TO A CONTINUOUSLY ROTATABLE TOOL BIT

[75] Inventors: Maximilian Stöck, Azmoos, Switzerland; Boris Koller, München, Germany; Martin Richter, Freising, Germany; Hans-Werner Bongers-Ambrosius, Iffeldorf, Germany

[73] Assignee: Hilti Aktiensellschaft, Furstentum, Liechtenstein

[21] Appl. No.: 621,387

[22] Filed: Mar. 25, 1996

[30] Foreign Application Priority Data

Mar. 24, 1995 [DE] Germany .................. 195 10 964.3
Aug. 26, 1995 [DE] Germany .................. 195 31 389.5

[51] Int. Cl.⁶ .................................................. B23B 45/16
[52] U.S. Cl. ........................... 408/17; 74/22 R; 173/93; 173/205
[58] Field of Search ............... 74/22 R; 408/17, 408/20–22; 173/93, 93.5, 114, 178, 205

[56] References Cited

U.S. PATENT DOCUMENTS 1,665,173  4/1928  Misener .................................. 74/22 R
2,556,163  6/1951  Beeson et al. ........................ 74/22 R
2,724,573 11/1955  Lundquist .............................. 74/22 R

*Primary Examiner*—Steven C. Bishop
*Attorney, Agent, or Firm*—Anderson Kill & Olick, P.C.

[57] ABSTRACT

A device for transmitting impulse-like blows to a continuously rotatable tool bit (6) is formed as an axially extending adapter (1) having a first chuck for the tool bit (6) and being insertable at a trailing end into a second tool bit chuck in a manually operated tool equipped with a striking mechanism. The adapter (1) has a housing (2) containing a unit for superimposing a second blow component on the first impulse blow component produced by the striking mechanism, so that an impulse-like drilling blow can be transmitted to the drill bit (6) made up of an axially directed blow component and a torsional blow component.

14 Claims, 6 Drawing Sheets

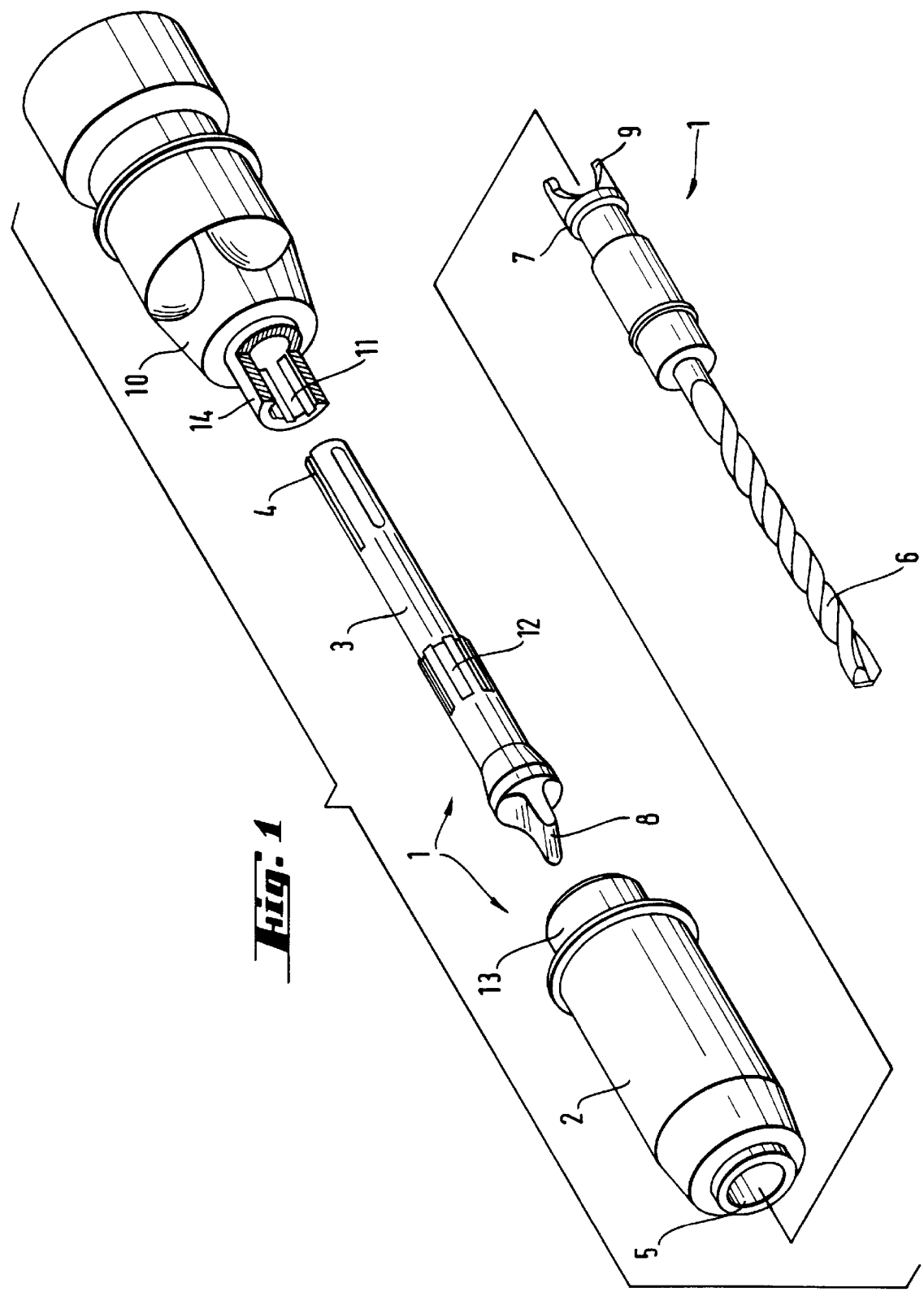

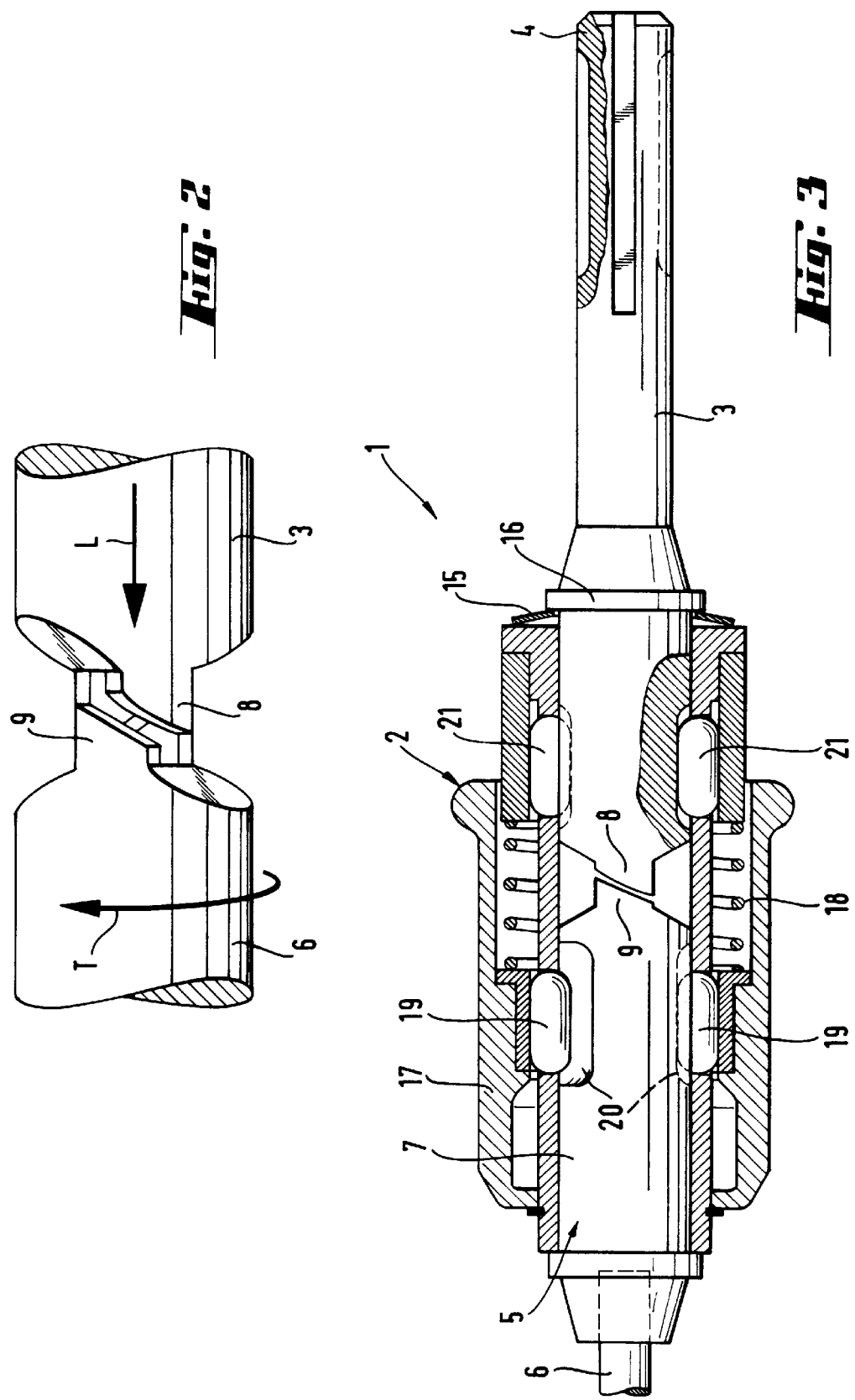

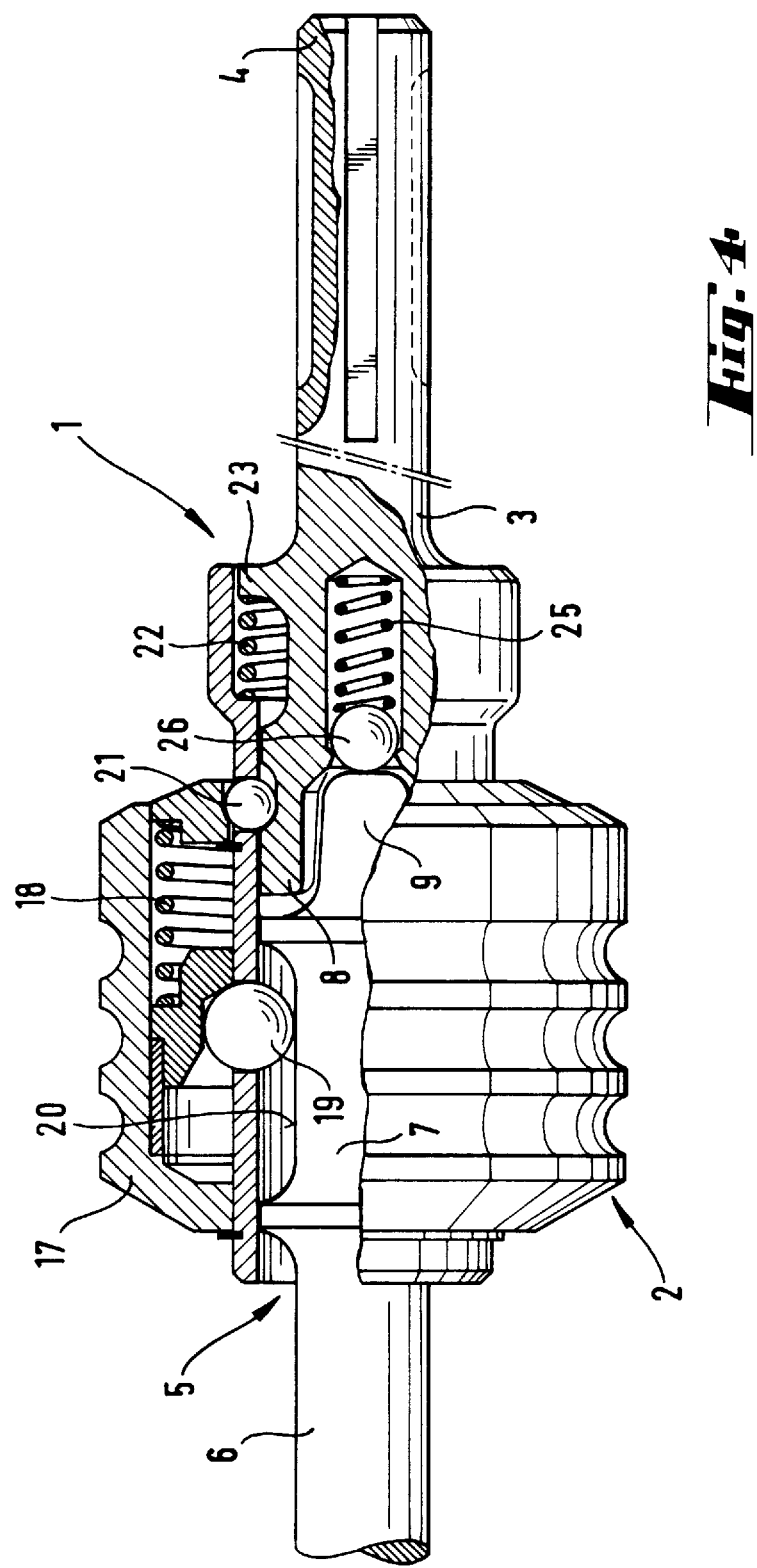

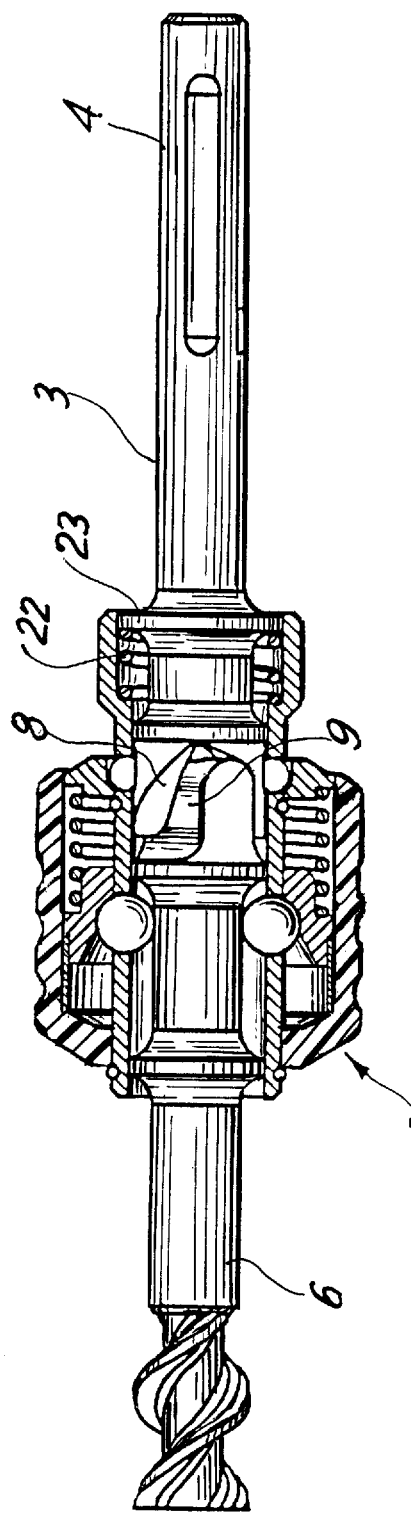
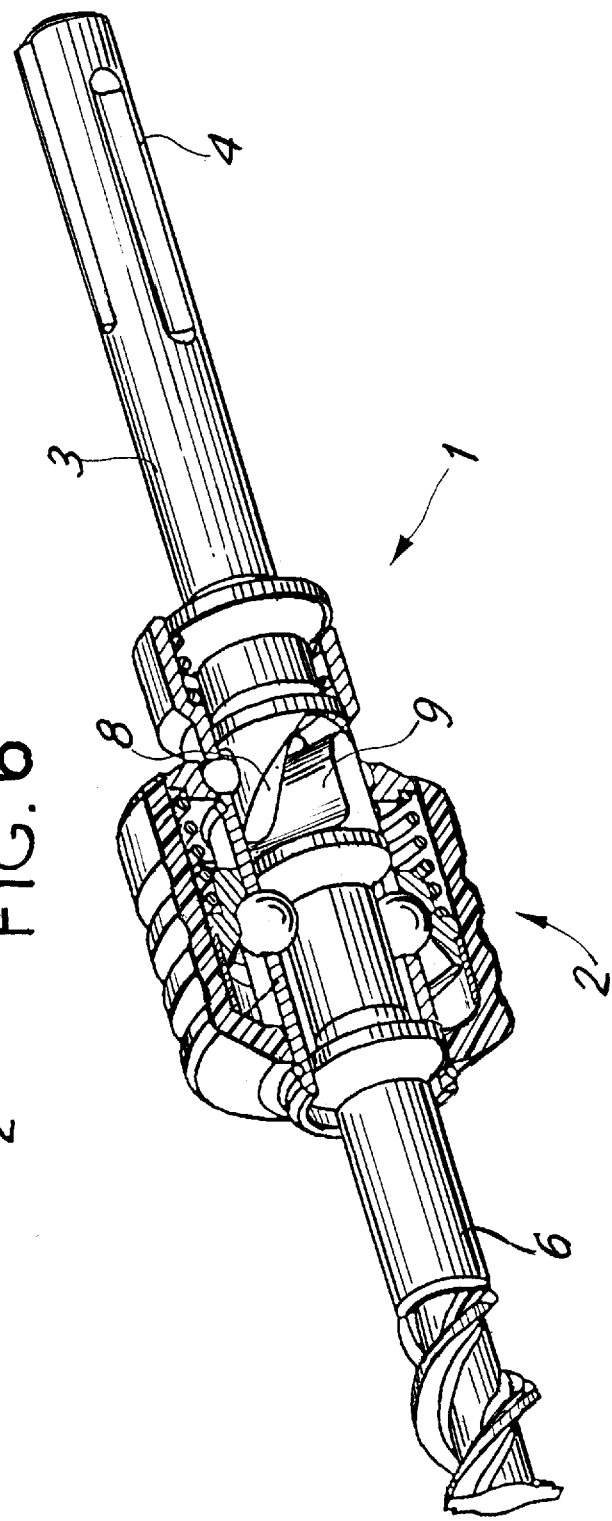

DEVICE FOR TRANSMITTING IMPULSE-LIKE BLOWS TO A CONTINUOUSLY ROTATABLE TOOL BIT

BACKGROUND OF THE INVENTION

The present invention is directed to a device for transmitting impulse-like blows to a continuously rotatable tool bit and includes a chuck for the tool bit and an intermediate member for transmitting impulse-like blows and a continuous rotary motion from a manually operated tool to the tool bit.

In the construction industry, for instance, in the installation of equipment and in the electric trade, it is often necessary to effect removal work on construction materials, such as concrete, with or without reinforcing steel and other construction materials. As an example, bores or openings for installing attachment members, channels for running lines, recesses for plug in sockets, and for many other items are required. Preferably, manually operated tools along with suitable tool bits are used with this type of work. For drilling bores in minerally based material, such as concrete, rock and masonry, so-called hammer drills have been particularly effective. Hammer drills have a continuously driven tool bit chuck and a motor actuated striking mechanism. In actual operation an impulse-like blow is transmitted to a continuously rotating tool bit secured in a tool bit chuck and such blows assist in drilling the base material. In known hammer drills with a large material removal output, the striking mechanism is an electropneumatic-producing mechanism which applies axially directed blows to the tool bit.

These known hammer drills have good material removal properties in purely mineral based materials, such as masonry, rock or concrete, and have been found to be very efficient when used manually in dry drilling operations. When cutting reinforced concrete, however, such efficiency can be limited, particularly if the tool bit strikes the reinforcing steel. When hammer drills are used in reinforced concrete, the reinforcing steel is primarily deformed and cold worked by the axially directed blows acting on the tool bit and the material removal output is considerably reduced. Accordingly, it is frequently necessary, when the tool bit strikes the reinforcing steel, to interrupt the drilling operation and attempt to drill a new bore hole at another point in the reinforced concrete base material. Such procedure is unsatisfactory and leads to a considerable loss of time. Blows directed against reinforcing steel occur in a sudden manner when drilling reinforced concrete and often the operator of the tool is unprepared for such developments. When this happens, dangerous situations can occur, because of the suddenly developing torque peaks.

SUMMARY OF THE INVENTION

Therefore, it is a primary object of the present invention to provide a device where different types of base materials can be drilled efficiently and safely and preferably in a dry drilling operation. In particular, the safety of the operator should remain assured when the tool bit impacts against reinforcing steel and dangerous torque peaks should be avoided. The device permits the placement of the tool bit at any desired location, even if there is an impact against reinforcing steel. The device permits the continued operation of existing manually operated tools without requiring any substantial tool modifications.

In accordance with the present invention, a device for transmitting impulse-like blows to a continuously operating tool bit involves an axially extending adapter having a leading end containing a first tool bit chuck and a trailing end for insertion into a second tool bit chuck in a manually operated tool with a striking mechanism for producing a first blow component. The adapter has an axially extending housing reaching from the first tool bit chuck towards its trailing end. Means are provided within the housing for superimposing a second blow component on the first blow component provided by the striking mechanism, so that an axially directed blow component and a torsional blow component are applied to the tool bit. Accordingly, the device of the present invention comprises an adapter insertable at its trailing end into a chuck on a manually operated tool equipped with a striking mechanism, while at its opposite end it provides a chuck for a tool bit. The adapter includes a housing extending rearwardly from its leading end in which means are provided for superimposing a second blow component upon the impulse-like component generated by the striking mechanism of the tool in such a way that an impulse-like drilling operation is effected by the tool bit formed of an axially directed blow component and a torsional blow component.

Due to the superimposition of an axially directed blow component and a torsional blow component, the direction of the force vector at the cutting edge of the tool bit in contact with the base material being drilled, is redirected from the axial direction of the tool bit, for instance, as compared to a tool bit with a single axially directed blow assist. Due to this redirection of the force vector, the reinforcing steel is sheared off in the event the tool bit strikes against it during the drilling operation. Accordingly, suddenly developing torque peaks are avoided when ordinarily the tool bit would become jammed and the safety of the tool operator is improved. Even when mineral base materials without reinforcement are being drilled, the shearing action of the drilling blow assists in the material removal process. Because of the energy-wise favorable material removal operation, the generation of heat is reduced and this permits the performance of the drilling operation without cooling in the case of large diameter bore holes, and particularly in hard base materials. The combination of a manually operated tool equipped with a striking mechanism for axially directed blows along with the adapter of the present invention affords the superimposition of a torsional component to the axially directed blow component for producing an impulse-like drilling blow affording efficient drilling of brittle and/or base materials with little ductility in dry drilling operations.

In a preferred embodiment of the present invention, the means in the adapter located within the housing is formed by entrainment faces, whereby a portion of the blow energy of an axially directed blow produced by the striking mechanism of the tool can be converted into a torsional blow component. By such mechanical conversion of a part of the blow energy of the axially directed blow component, it is possible to use the invention with known hammer drills provided with axially directed blow assist. The axially directed blows are preferably produced by an electropneumatic striking mechanism and converted into a drilling blow through the use of known physical principles. Accordingly, the effect of a wedge, lever, pressure prorogation, elastic shear deformation, or lateral contraction can be utilized for generating the second blow component.

It goes without saying that the principle of the conversion of a part of the shock energy in the adapter also applies on the basis of a torsional striking mechanism. As the shock or blow energy of the axially direct ed blow can be partially converted into a torsional blow component, the blow energy of a torsional blow can also be converted into an axially converted blow component. The means for producing the drilling blow located inside the housing of the adapter is effected in a completely analogous manner, preferably where the entrainment faces cooperate with one another. The blow components produced in this manner are superimposed on a drilling flow which effects a chiseling or drilling as well as a shearing of the base material.

Accordingly, a particularly compact adapter is provided, if the entrainment faces are disposed at one end of an intermediate member with the other end shaped as an interface or connecting face with the tool bit chuck of the manually operated tool and cooperates with correspondingly arranged matching entrainment faces provided at the trailing end of the tool bit which can be inserted into the end of the adapter spaced from the manually operated tool. The interface of the intermediate member is designed in a known manner the same as the insertion ends of the known generation of tool bits that can be inserted into and locked in known tool bit chucks of the manual tool without any additional modifications. The intermediate member transmits the continuous rotary motion and the usual axially directed blow component through the adapter.

It is advantageous for the effective operation of a manually operated tool with the attached adapter for producing the rotary blow, if the housing is provided with a device at its trailing end facing the tool bit chuck of the manually operated tool, so that the housing of the adapter is largely separated from the impulse-like blows produced in operation.

Another embodiment of the invention uses a cylindrical sleeve affording a cylindrical extension projecting from the chuck of the manually operated tool at the trailing end of the adapter. In operation, the trailing end of the housing supports the cylindrical projection of the sleeve, so that the cooperating and matching entrainment face on the intermediate member or at the trailing end of the tool bit are relieved from the contact pressure force applied by the tool operator. In this manner the drilling blow with the cooperating entrainment faces does not have to overcome the contact pressure force and the housing of the adapter is largely separated from the impulse-like blows. Only slight modifications are required in this embodiment on the chuck of the manual tool which involve affording a cylindrical projection suited to the length of the intermediate member.

To eliminate even slight modifications, it is advantageous if the device includes a prestressed spring element fixed at the trailing end of the adapter facing the chuck of the manually operated tool, with an annular collar located on the intermediate member and pressing against the spring element. Such an adapter can be used without any further modifications on known manually operated tools using striking mechanisms for axially directed blows. Differing from the known tools, only tool bits with special entrainment faces at their insertion ends must be used in the adapter. With the annular collar on the intermediate member, which abuts the housing through the prestress spring element, it is assured that the tool bit is easily returned into its initial position ready for the next blow after the blow effected by the superimposed rotary motion. Due to the additional sequence a slight restoring motion of the tool bit results counter to the contact pressure force. This provides a good contact between the blow imparting faces of the entrainment faces for the next blow.

An especially simple construction of the adapter results, if the prestressed spring element is a Belleville spring washer or a cup spring having a spring force sized so that the adapter housing is largely separated from the impulse-like blows. The spring force of such springs amounts advantageously to a range of about 300 to 1,000 Newtons, preferably approximately 500 Newtons. It is assured with such a selected spring force, that the contact pressure forces, generated customarily by the operator, can be absorbed. Accordingly, the blow behavior remains largely independent of the contact pressure force and thus is kept stable. The housing is separated from the blows, since the stiffness of the spring is much less than the stiffness of the cooperating entrainment faces.

In another preferred embodiment of the adapter of the present invention, the contact pressure force supplied by the operator is transmitted through the intermediate member and the trailing end of the tool bit. Means are provided for this purpose which in operation periodically unload the contact pressure force applied by the operator from the cooperating entrainment faces at the intermediate member or at the insertion end.

Means are advantageously provided in the axial contact region of the cooperating entrainment faces and comprise a spring-loaded abutment element. The abutment element can be provided in one end region of the intermediate member or in the end region of the insertion end of the tool bit. A spring-loaded ball or spherical abutment element is particularly easy to manufacture.

A helical spring is the simplest type of spring for applying a load to the abutment element. The spring force of the spring is in the range of about 300 to 1,000 Newtons preferably, about 500 Newtons. Within this range of spring forces it is assured, in spite of the pressure force applied by the operator, that a periodic unloading of the cooperating entrainment faces is possible, which assures that the tool bit is again returned, following each blow, into the initial position for commencement of the next impulse-like blow.

The intermediate member is provided with a circumferential annular collar, preferably in its region cooperating with the housing. The annular collar of the intermediate member abuts the spring element located at the end of the housing facing the chuck of the manually operated tool. The spring force of the spring element is sized and matched to the mass of the housing, so that the housing is not excited to perform natural vibrations by the impulse-like blows during the operation of the manually operated tool and, thus, is separated from the impulse-like blows.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the drawings:

FIG. 1 is an exploded perspective view of a device embodying the present invention along with the chuck of a manually operated tool;

FIG. 2 is a partial view displaying the mechanical flow conversion of the present invention;

FIG. 3 is another embodiment of the device of the present invention shown partially in axially extending section; and FIG. 4 is yet another embodiment of a device of the present invention also illustrated partially in axially extending section;

FIG. 6 is an enlarged axially extending view partly in section of the device shown in FIG. 5 illustrating the interengagement of entrainment faces;

FIG. 7 is an axially extending perspective view partly in section of the device as illustrated in FIG. 6.

DETAILED DESCRIPTION OF THE INVENTION

Figure 5:
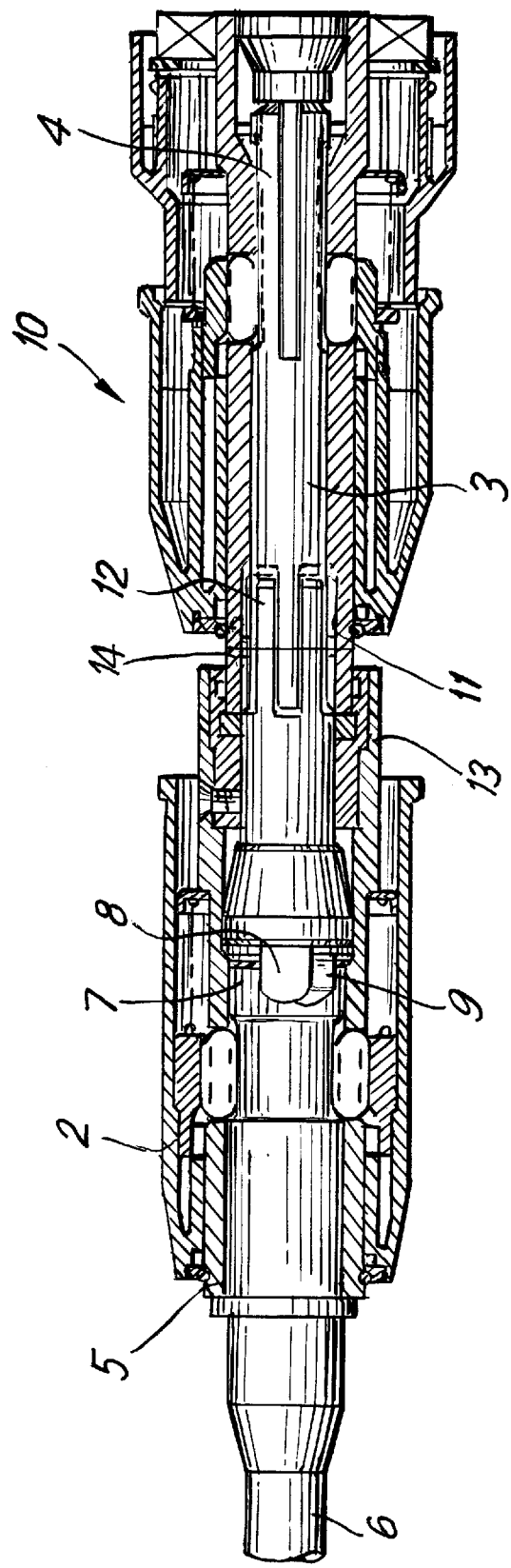
FIG. 5 is an axially extending cross sectional view of the device illustrated in FIG. 4.

In FIG. 1 an exploded perspective view of a first embodiment of the adapter 1 of the present invention is shown along with a tool bit chuck 10 of a hammer drill, not shown, such as a tool manufactured by Hilti Aktiengesellshaft. The adapter 1 is an axially elongated device having a leading end and a trailing end with a housing 2 at its leading end and an axially extending intermediate member 3 lockable in the housing 2. Intermediate member 3 has an insertion end 4 at its trailing end, which corresponds to the known insertion or trailing end of tool bits, such as those manufactured by Hilti Aktiengesellshaft, and has axially extending locking grooves and rotary entrainment grooves which cooperate with correspondingly shaped elements in the tool bit chuck 10 of the hammer drill. The leading end of the adapter is formed as a chuck 5 for receiving the trailing end of the tool bit 6, to be explained later in greater detail.

Intermediate member 3 has entrainment faces 8 at its leading end, that is the opposite end from the insertion end 4. These entrainment faces cooperate with correspondingly shaped entrainment faces 9 at the trailing end of the tool bit 6. The entrainment faces 8 have planar or flat side faces and a cylindrically curved front or leading end face joining the side faces, note FIG. 1. The entrainment faces 9 on the trailing end 7 of the tool bit 6 are basically fork-like having concavely-shaped inside faces twisted with respect to the tool bit axis and with respect to each other. When assembled the leading end of the intermediate member is positioned within the fork-like side walls or entrainment faces 9 of the trailing end 7 of the tool bit 6. The intermediate member 3 is rotated by the hammer drill. This rotation is transmitted to the tool bit 6 by the rotational formlocking engagement of the leading end side walls of the entrainment faces 8 of the intermediate member 3 to the inside faces of the entrainment faces 9 at the trailing end of the tool bit 6. When an axial blow is directed against the intermediate member 3 the flat side faces and cylindrically curved leading end face of the entrainment faces 8 cooperate with the concavelyshaped and twisted entrainment faces 9 at the trailing end 7 of the tool bit 6. As a result, the entrainment faces 8 slide along the entrainment faces 9. Due to the cooperation between the coulisses and/or entrainment faces 8, 9, on the intermediate member 3 and at the trailing end 7 of the tool bit 6, a portion of the impulse of the axially directed blows L produced by the striking mechanism in the hammer drill is converted mechanically into a torque or torsional movement and such torque is superimposed as a torsional blow component T on the axially directed blow L, note FIG. 2. As a result, a two component drilling blow is transmitted to the continuously rotating tool bit 6 secured in the chuck 5 of the adapter 1.

Figure 8:
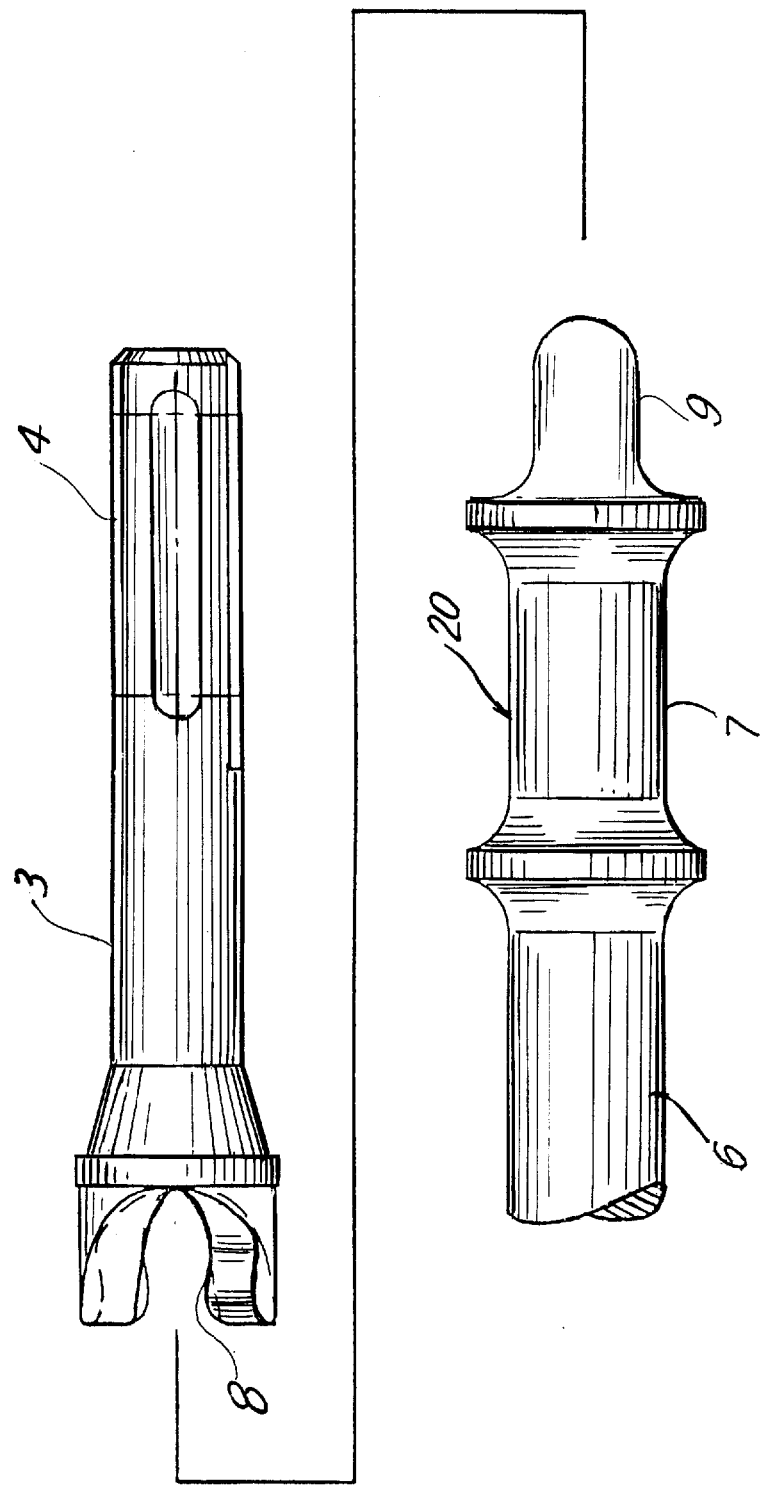
Fig. 8 is a further enlarger and axially extending exploded view of the entrainment faces illustrated in FIGS. 6 and 7.

FIGS. 5, 6, 7 and 8 show the shape of the entrainment faces 8, 9 and the manner in which they interengage. In these figures, the fork-like form of the entrainment faces 8 receives the flat sided faces of the entrainment faces 9.

By the superimposition of the axially directed blow component L and the torsional blow component T, the direction of the force vector at the cutting edge of the tool bit 6, in engagement with the material being drilled, is transformed from the axial direction of the tool bit, as compared to a conventional hammer drill with a purely axially directed blow assist and a conventional tool bit. Due to the changed direction of the force vector, reinforcing steel is cut off by shear,if the cutting edge of the tool bit strikes such reinforcement. This arrangement avoids any suddenly developing torque peaks such as if the tool bit becomes jammed and the safety of the tool operator is thus improved. Even in mineral based materials without reinforcing steel, the shearing effect of the drilling blow aids in the removal of the drilled material.

The axially directed shock wave and the shock wave of the torsional blow develop at different velocities in the tool bit. For tool bits of relatively short axial lengths, for instance, less than 300 mm, the varying velocities have very little effect. The two waves arrive almost simultaneously at the cutting edge of the tool bit. With longer tool bits, the different velocities can be made use of in a specific manner. In such case, the cutting edge of the tool bit penetrates into the base material as a result of the axially directed blow and removes material by cutting the base material under the effect of the lagging torsional wave by a shearing action. The direction of the force vector at the cutting edge of the tool bit depends on the radius of the tool bit. In the center of the cutting edge, the force acts always in the axial direction of the tool bit independently of the shear of the torsional blow. Depending upon the shear of the torsional blow component, the direction of the force vector at the cutting edge assumes an inclination as a function of the increasing radius.

The drilling blow produced has an overall shock energy made up of a rotary shock energy of the torsional blow component T and of an axially directed shock energy of the axially directed component L. The following formula applies:

$$0.02 < E_t E_l D < 0.5$$

where $E_t$ represents the rotary shock energy, $E_l$ represents the axially directed shock energy and D, measured in millimeters, represents the diameter of the tool bit 6 clamped in the chuck 5 of the adapter 1. Within the preferred range of the relationship of the blow energies of the two blow components, a good axial penetration of the tool bit cutting edge into the base material and an adequate material removal through shearing action is assured.

Housing 2 has a cylindrical extension 13 at its trailing end facing the chuck 10 of the hammer drill for separating or decoupling the housing 2 of the adapter 1 from impulse-like blows produced in operation. The cylindrical extension 13 receives a cylindrical sleeve-like projection 14 extending from the chuck 10 and abutting the extension 13 in such a way that the intermediate member 3 is relieved from the contact pressure applied by the operator. The cylindrical projection 14 extending towards the leading end of the adapter 1 can, at the same time, be used for improved transmission of torque to the tool bit by equipping its inside surface with entrainment devices 11 which engage similarly shaped rotary entrainment grooves 12 in the intermediate member 3 spaced between its leading and trailing ends.

FIG. 3 displays another embodiment of the adapter of the present invention illustrated partially in axial section. As distinguished from FIG. 1, in FIG. 3 the adapter 1 is assembled with the tool bit 6 inserted into the chuck 5. The chuck 10 of the hammer drill is not shown for reasons of clarity The manner in which the trailing end of the tool bit 6 is retained in the chuck 5 is evident from the drawing. Accordingly, housing 2 has an axially extending laterally enclosing sleeve 17 displaceable axially against the force of a spring 18 and the sleeve cooperates with locking rollers 19. The locking rollers 19 engage into locking grooves 20 on the trailing end region of the tool bit for fixing the bit in the adapter. By pulling sleeve 17 back in the axial direction against the force of the spring 18, the rollers are released and the tool bit can be removed from the chuck 5.

The intermediate member 3 is secured in the housing in a similar manner by rollers 21. The cooperating entrainment faces 9, 8 are located on the trailing end of the tool bit 6 and on the leading end of the intermediate member 3. In FIG. 3 the entrainment faces 9, 8 are only shown schematically, but are similar to the entrainment faces illustrated in FIG. 1 and operate in the same manner. As in the embodiment described with respect to FIG. 1, an arrangement is again provided for decoupling or separating the housing 2 of the adapter 1 from the impulse-like blows developed during drilling operations. For this purpose, a prestressed spring element 15 is provided at the trailing end of the adapter 1 facing the chuck 6, not shown, of the hammer drill and abuts against an annular collar 16 formed on the intermediate member 3 between its leading and trailing ends. Preferably, the spring element 15 is a Belleville spring washer having a spring force in the range of 300 to 1000 Newtons, preferably about 500 Newtons. With the selected spring force it is assured that the contact pressure forces, usually generated in drilling operations by the operator, are not transmitted to the adapter so that the blow behavior remains largely independent of the contact pressure force and thus is stable. The housing 2 of the adapter 1 is separated from the blow action, since the stiffness of the Belleville spring washer 16 is much smaller than the stiffness of the cooperating coulisses and/or entrainment faces 8, 9.

In FIG. 4 yet another embodiment of the adapter 1 of the present invention is displayed. For the most part it corresponds in its arrangement to the adapter described with regard to FIG. 3 and for this reason similar reference numerals are used for similar components. It is evident from the illustrated embodiment in FIG. 4 that the locking elements 19 for the trailing end region 7 of the tool bit 6 and for the locking elements 21 for the intermediate member 3 are shaped as balls or spheres.

As distinguished from the embodiment shown in FIG. 2, and as in the case of the adapter 1 illustrated in FIG. 1, in FIG. 4 the contact pressure force applied by the tool operator is transmitted directly through the intermediate member 3 and the trailing end of the tool bit 7. Nevertheless, to enable the trailing end 7 to return to its initial position for transmission conversion of the next impulse-like blow, preferably a ball-shaped abutment element 26, loaded by a spring 25, is disposed in the region of the cooperating and matching entrainment faces 8, 9. The spring 25 and the abutment element 26 can be fixed in the trailing end of the tool bit or, as shown, in the leading end of the intermediate member in the base of the entrainment face 8 of the intermediate member 3. Preferably, this spring 25, is a helical spring with a spring force in the range of about 300 to 1000 Newtons, preferably about 500 newtons. With these spring forces the intended periodic return motion of the tool bit still takes place in spite of the contact pressure force usually applied by the operator.

To assure the separation of the housing 2 of the adapter 1 from the impulse-like blows applied in the drilling operation in the embodiment displayed in FIG. 4, a spring element 22 is located in the trailing end region of the housing 2 with the spring element bearing against the housing at one end and against an annular collar 23 formed on the intermediate member 3 adjacent its leading end. The spring force of the spring element 22 is sized and matched to the mass of the housing 2 whereby the housing does not develop natural vibrations initiated in the operation of the impulse-like blows. While in FIG. 1 the flat sided faces and cylindrically curved end face of the entrainment faces 8 are located on the intermediate member 3 and the fork-like entrainment faces 9 are located on the tool bit 6, in FIG. 4a a reversed arrangement is displayed. The fork-like entrainment faces 8 are formed on the intermediate member and the flat sided faces and cylindrically curved end face of the entrainment faces 9 are formed on the trailing end of the tool bit. The effect of such reversal of the entrainment faces in the transformation of part of the axial blow into a torsional blow with simultaneous superposition to and two components drillings blow remains the same. This reversed arrangement of the entrainment faces is illustrated in FIGS. 5, 6, 7 and 8.

The adapter of the present invention has been described along with a hammer drill preferable employing an electropneumatic striking mechanism for the axially directed blows. It goes without saying that a manually operated tool with a striking mechanism can be utilized which produces torsional blows. In such an instance, the entrainment faces cooperating in the adapter are arranged so that an axially directed blow is produced from a portion of the torsional blow component. A drilling blow is then generated by the superimposition of the two blow components.

Because of the superimposition of the axially directed blow component and the torsional blow component, the direction of the force vector, at the cutting edge at the tool bit in contact with the base material being drilled, is displaced out of the axial direction of the tool bit. Due to this change of direction of the force vector, the reinforcing steel, if encountered, is cut by shear. As a result, suddenly developing torque peaks occurring when the tool becomes jammed can be avoided and the safety of the manually operated tool is enhanced. In mineral based materials without reinforcement, the shearing action of the drilling blow assists in the removal of the drilled material. Heat generation is reduced due to the energy-wise more favorable material removal process with the result that it is possible to do without additional cooling when drilling holes of larger diameter, particularly in hard base materials. The combination of a manually operated tool, provided with a blow generating or striking mechanism for effecting axially directed blows, and the adapter of the present invention superimposes a torsional component upon the axially directed blow component for producing an impulse-like drilling blow and permits efficient drilled material removal from brittle and/or non-ductile base materials when using a dry drilling procedure.

While specific embodiments of the invention have been shown and described in detail to illustrate the application of the inventive principles, it will be understood that the invention may be embodied otherwise without departing from such principles.

What is claimed is:

1. Device for transmitting impulse-like blows to a continually rotatable axially elongated tool bit (6) having a leading end, a trailing end and an axially extending trailing end region comprising an axially extending adapter (1) having a leading end containing a first tool bit chuck (5) and a trailing end arranged for insertion into a second tool bit chuck (10) of a manually operated tool with a striking mechanism for producing a first blow component, said adapter (1) having an axially extending housing (2) reaching from said first tool bit chuck (5) towards said trailing end thereof, first means (8, 9) within said housing (2) for superimposing a second blow component on the first blow component for transmitting an impulse-like drilling blow comprising an axially directed blow component (L) and a torsional blow component (T) to said tool bit.

2. Device, as set forth in claim 1, wherein said first means (8,9) comprises interengaging entrainment faces (8, 9) so that a portion of the axially directed blow component (L) produced by a striker mechanism in the manually operated tool can be converted for producing the torsional blow component (T).

3. Device, as set forth in claim 2, wherein said entrainment faces (8) are disposed at a leading end of an intermediate member (3) located within said axially extended housing (2) and said intermediate member (3) having a trailing end arranged to be inserted into said second tool bit chuck (10) of the manually operated tool, and said entrainment faces (8) cooperating with correspondingly shaped entrainment faces (9) at the trailing end of said tool bit (6) inserted into said first tool bit chuck (5) in said adapter (1).

4. Device, as set forth in claim 3, wherein said housing (2) having second means at the trailing end thereof for separating impulse blows applied to said tool from said housing applied by the manually operated tool.

5. Device, as set forth in claim 4, wherein said second means comprises that said housing (2) has a cylindrical sleeve (13) located at and extending axially from the trailing end of said housing (2) and being arranged to receive a cylindrical projection (14) extending axially outwardly from said second tool bit chuck (10) whereby the cooperating and matching entrainment faces (8,9) on said intermediate member (3) and of said trailing end (7) of said tool bit (6) are relieved from contact pressure force applied by an operator of the manually operated tool.

6. Device, as set forth in claim 4, whereby said second means comprises that said adapter (1) comprises a prestressed spring element (15) located at the trailing end of said housing (2) and bearing against an annular collar (16) on said intermediate member (3) located between the ends thereof for separating said housing (2) from the impulse-like blows during operation of said manually operated tool.

7. Device, as set forth in claim 6, wherein said spring element (15) is a Belleville spring washer having a spring force in the range of 300 to 1000 Newtons.

8. Device, as set forth in claim 7, wherein said spring element (15) having a spring force of about 500 Newtons.

9. Device, as set forth in claim 3, wherein contact pressure force is applied by an operator of the manually operated tool and transmitted through said intermediate member (3) and said trailing end (7) of said tool bit (6) comprises second means (25, 26) for periodically relieving the cooperating matching entrainment faces (8, 9) from the contact pressure force of the operator.

10. Device, as set forth in claim 9, wherein said second means (26, 25) being located in one of contacting faces of the cooperating matching entrainment faces (8, 9) and comprising an abutment element (26) loaded by a spring (25).

11. Device, as set forth in claim 10, wherein said abutment element (26) is a spring loaded ball.

12. Device, as set forth in claim 11, wherein said spring (25) being a helical spring having a spring force in the range of about 300 to 1000 Newtons.

13. Device, as set forth in claim 12, wherein said spring (25) having spring force of about 500 Newtons.

14. Device, as set forth in claim 9, wherein said second means comprises that said intermediate member (3) having a circumferentially extending annular collar (23) intermediate the leading and trailing ends thereof and located adjacent to the trailing end of said housing (2) and said annular collar (23) abutting an axially extending spring element (22) located at the trailing end of said housing with said spring element (22) abutting said housing and having a spring force sized so that said housing (2) is separated from the impulse-like blows supplied in the operation of the manually operated tool.

* * * * *

UNITED STATES PATENT AND TRADEMARK OFFICE

CERTIFICATE OF CORRECTION

PATENT NO.    : 5,820,312

DATED         : October 13, 1998

INVENTOR(S)   : Maximilian Stöck, et al

It is certified that error appears in the above-identified patent and that said Letters Patent is hereby corrected as shown below:

On the title page: Item

[73] Assignee: Hilti Aktiengesellschaft, Schaan, Liechtenstein

Signed and Sealed this

Second Day of March, 1999

*Attest:*

Q. TODD DICKINSON

*Attesting Officer*  *Acting Commissioner of Patents and Trademarks*